United States Patent [19]

Rutan

[11] 4,042,251

[45] Aug. 16, 1977

[54] SAFETY DEVICE FOR LAWN MOWERS

[76] Inventor: Clifford S. Rutan, 24 Lake Road, Morristown, N.J. 07960

[21] Appl. No.: 706,181

[22] Filed: July 19, 1976

[51] Int. Cl.² .............................................. B62B 1/00
[52] U.S. Cl. .................................. 280/47.33; 56/17.5; 180/19 R; 188/6; 188/177; 188/206 R
[58] Field of Search ...................... 188/5, 6, 7, 8, 82.1, 188/21, 23, 177, 205, 206; 56/17.5, 16.7; 280/47.33, 47.34, 47.37 R; 180/19 R

[56] References Cited

U.S. PATENT DOCUMENTS

| 2,469,909 | 5/1949 | Wickman et al. | 280/47.33 X |
| 2,761,226 | 9/1956 | Solem | 188/8 X |
| 2,864,293 | 12/1958 | Edrich et al. | 180/19 R |
| 2,886,139 | 5/1959 | Wilson | 188/5 |
| 2,905,103 | 9/1959 | Christiansen | 180/19 R X |
| 3,093,387 | 6/1963 | O'Neill | 280/47.33 X |
| 3,292,738 | 12/1966 | Bernert et al. | 188/6 |
| 3,307,658 | 3/1967 | Stevenson | 188/5 |
| 3,696,593 | 10/1972 | Thorud et al. | 56/17.5 |

FOREIGN PATENT DOCUMENTS

| 1,106,010 | 7/1955 | France | 280/47.34 |
| 1,270,634 | 7/1961 | France | 56/17.5 |

Primary Examiner—George E. A. Halvosa
Attorney, Agent, or Firm—Joel Halpern

[57] ABSTRACT

A safety device for lawn mowers includes an elongated frame assembly having a pair of laterally spaced leg elements connected by a bight section. A plurality of ground anchoring elements depend from the bight section and are adapted to be selectively affixed in the ground to prevent rolling of the mower. The device includes clamping plates for fixedly securing the assembly to the handle of a lawn mower in angular relation thereto such that the ground anchoring elements are out of contact with the ground during normal operation of the mower and the mower is pivotable upon its rear wheels in an emergency to thereby shift said leg elements into a position substantially perpendicular to the ground and drive the ground anchoring elements into the ground to prevent rolling of the mower.

5 Claims, 3 Drawing Figures

U.S. Patent  Aug. 16, 1977  4,042,251
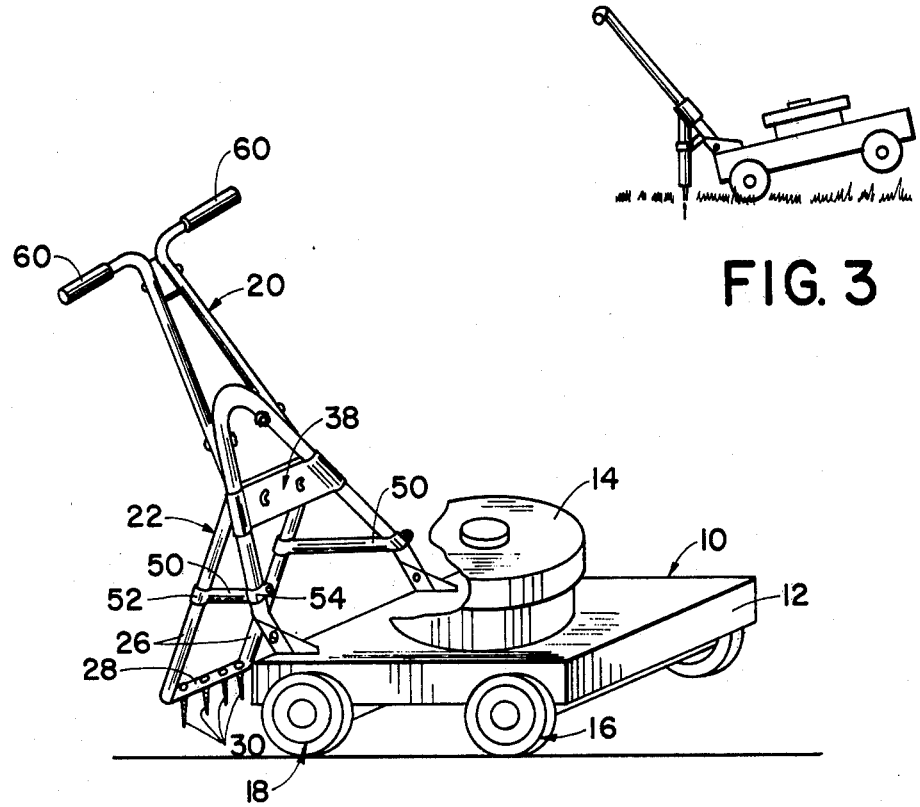
FIG. 3
FIG. 1
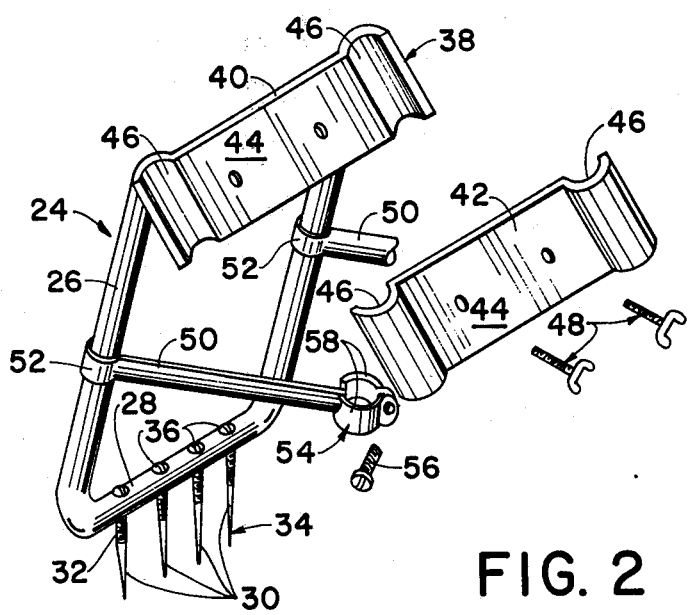
FIG. 2

SAFETY DEVICE FOR LAWN MOWERS

BACKGROUND OF THE INVENTION

The present invention relates to lawn mowers and more particularly to a safety device adapted to prevent rolling of the mower in an emergency situation.

Safety devices have been provided prior to the present invention for controlling power lawn mowers in emergency situations. As is well known, there are occasions when serious physical injury has been inflicted upon the operator of the lawn mower due to his accidental slipping or stumbling. However, such prior safety devices have generally been designed to cut off the power to the cutting blade and have been rather complex and expensive. United States Patent 3,111,800 issued November 26, 1963, for example, discloses a safety device requiring an electrical system including a sensing antenna and a relay and blade-arresting arm arrangement. Although such safety devices are effective they are frequently too expensive to achieve widespread acceptance and are applicable only to power mowers. Further, such devices do not always prevent continued rolling of the mower which frequently leads to aggravation of the injury already sustained. There is, therefore, still an unsatisfied need for a simple safety device which is useful with both power mowers and with manually operated lawn mowers.

SUMMARY OF THE INVENTION

It is one object of the invention to provide a safety device for lawn mowers which, upon development of an emergency situation, prevents further rolling of the mower.

It is another object of the invention to provide a safety device for lawn mowers which is applicable to both power and manually driven mowers.

It is yet another object of the invention to provide a safety device for lawn mowers which is of extremely simple construction and can be easily installed on a lawn mower by a person unskilled in mechanics.

Other objects and advantages of the invention will become readily apparent from the following description of the invention.

According to the present invention there is provided a safety device for lawn mowers comprising in combination:

an elongated frame assembly including at least two laterally spaced leg elements connected across one end of each of said leg elements;

at least one ground anchoring element depending from said frame assembly at the end thereof where said leg elements are connected;

and clamping means secured to an extending transversely across the free ends of said leg elements, said clamping means being adapted to fixedly secure said frame assembly to the handle of a lawn mower in angular relation thereto and at a location such that the ground anchoring elements are out of contact with the ground during normal operation of the lawn mower, the mower being pivotable about its rear wheels to thereby shift said leg elements into a substantially vertical orientation and simultaneously secure the ground anchoring elements into the ground to support the lawn mower in a stable non-rollable position.

BRIEF DESCRIPTION OF THE DRAWINGS

In order that the invention may be more fully understood it will now be described, by way of example, with reference to the accompanying drawings in which:

FIG. 1 is a side perspective view of a lawn mower having the safety device of the present invention secured to the handle thereof;

FIG. 2 is a perspective exploded view of the safety device embodying the features of the invention; and FIG. 3 is a side elevational view of the lawn mower of FIG. 1 tilted into an inoperative position and maintained there by the safety device of the invention.

DETAILED DESCRIPTION OF THE INVENTION

Referring to the drawings there is shown in FIGS. 1 and 3 a lawn mower 10 of conventional construction including a cutter blade housing 12, power means 14 such as an electric motor or internal combustion engine, front and rear wheels 16, 18 and a handle 20. Secured to the handle of the mower is the safety device 22 of this invention.

The safety device comprises an elongated frame assembly 24. The frame assembly includes a pair of laterally spaced leg elements 26 having a bight section 28 connected therebetween at one end. It will be understood, of course, that more than two leg elements may be employed providing the desired degree of stability is afforded to safely retain the mower in the pivoted position shown in FIG. 3. It is within the contemplation of the invention to utilize a frame assembly of triangular configuration and in which the leg elements converge downwardly to terminate at the lower extremities thereof in a single anchoring element. However, it is presently preferred that the leg elements extend in generally parallel relation and be connected at their lower extremities by bight section 28.

As depicted in FIGS. 1 and 2 a plurality of anchoring elements 30 are carried by the bight section to depend therefrom in laterally spaced relation. Each of such anchoring elements desirably comprises a stud member which is threaded at one end thereof as at 32 and given a taper 34 at the other end to facilitate spiking or urging the anchoring elements into the ground as shown in FIG. 3. It will be appreciated that apertures 36 are formed in the bight section 28 to threadedly receive the studs. It will also be understood that in the event a triangular frame assembly is employed only a single anchoring element may be used which would depend from the point of juncture of the leg elements.

The safety device of the invention includes clamping means 38 for fixedly attaching the frame assembly to the handle of the lawn mower. Such clamping means may take the form of a first clamp plate 40 secured transversely across the leg elements adjacent the free ends thereof and a second like clamp plate 42 which is cooperable with the first clamp plate to clamp the handle of the mower therebetween. Desirably each such clamp plate comprises a flat plate section 44 and an arcuate recess 46 formed adjacent each end of the plate section and dimensioned to accomodate the tubular elongated portions of the handle. As depicted in FIG. 2 the frame assembly can be secured to the mower handle by positioning clamp plate 40 on the handle and couping clamp plate 42 thereto by means such as thumb screws 48 or equivalent fastening means.

Desirably the device of the invention includes a pair of elongated reinforcement rods 50. One end of each such rod is given a bracket 52 which is rotatable on the leg element so that the reinforcing rod can pivot thereabout from a locking position as shown in FIGS. 1 and 3 to a storage position in which the rods are folded inwardly of the leg elements to afford a compact form for storage. The other end of each reinforcement rod carries a second bracket 54 which can be separated to fit over the tubular portion of the handle. Fastening means such as screws 56 or the like may be employed to drawn arms 58 of the bracket together and thereby fixedly secure the rod to the handle.

The safety device of the invention is attachable to the handle of the lawn mower at a location thereon such that the anchoring elements 30 are normally carried by the frame assembly at an elevation above the level of the ground while the mower is in normal operation. The mower is thus free to roll along the ground on wheels 16, 18. It will be observed that the leg elements 26 and clamp plate 40 are joined in a fashion such that when the frame assembly is secured to the mower handle there is an acute angle formed. Due to such mounting of the frame assembly upon the handle downward pressure upon the handgrip elements 60 of the handle, such as occurs when the mower operator slips or otherwise loses balance and leans upon the handle for support, causes the mower to pivot in a counterclockwise direction about rear wheels 18 as a fulcrum and to drive anchoring elements 30 into the ground. This prevents any further rolling movement of the mower. In such position the leg elements of the safety device have been shifted to a substantially vertical position.

It will be understood that the mower may be safely stopped on an incline by pivoting the machine as described above so as to secure the anchoring elements in the ground even in circumstances where no emergency exists. Such storage of the mower in itself is a valuable advantage of the invention since inadvertant rolling of the mower with possible consequent damage to person and/or property may be avoided.

From the foregoing description it will be seen that a safety device for lawn mowers has been provided which is capable of achieving the objectives described above.

I claim:

1. A safety device for attachment to a lawn mower comprising in combination:
   an elongated frame assembly including at least two laterally spaced leg elements connected across one end of each of said leg elements;
   at least one ground anchoring element depending from said frame assembly at the end thereof where said leg elements are connected;
   and clamping means extending transversely across the free ends of said leg elements, said clamping means including first and second clamp plates, said first clamp plate being integral with said frame assembly and said second clamp plate being separate from and cooperable with said first clamp plate to clamp the handle of a lawn mower therebetween;
   a pair of elongated reinforcement members being provided each of which is rotatably secured at one end thereof to one of said leg elements and adapted at the other end thereof to be fixedly secured to the handle of a lawn mower at a location spaced from the point of securement of said clamp plates and the handle of the mower;
   said clamping means being thus adapted to fixedly secure said frame assembly to the handle of the lawn mower in angular relation thereto and at a location such that the ground anchoring elements are out of contact with the ground during normal operation of the lawn mower, the mower being pivotable about its rear wheels to thereby shift said leg elements into a substantially vertical orientation and simultaneously secure the ground anchoring elements into the ground to support the lawn mower in a stable nonrollable position.

2. A safety device according to claim 1, wherein each of said clamp plates comprises a flat plate section having an arcuate recess formed adjacent each end thereof, said recesses being dimensioned to accomodate a tubular lawn mower handle therein.

3. A safety device according to claim 1, wherein each of said reinforcement members comprises a rod element having a first bracket integral therewith at one end thereof securable rotatably to one of said leg elements and a second clamp bracket at the other end thereof adapted to secure the rod element fixedly to a lawn mower handle.

4. A safety device according to claim 1, wherein said leg elements are connected at said one end by a bight section and a plurality of said anchoring elements depend from laterally spaced locations of said bight section.

5. A safety device according to claim 1, wherein said ground anchoring elements comprise studs which are threaded at one end thereof and tapered at the other end thereof, said leg elements of the frame assembly being connected by a bight section which is provided with a plurality of threaded apertures adapted to receive respective one of said studs.

* * * * *